July 15, 1969    A. J. TUCKER    3,455,267
SYSTEM FOR REDUCING FRICTIONAL DRAG RESISTANCE ON A SHIP HULL
Filed Jan. 15, 1968    2 Sheets-Sheet 1
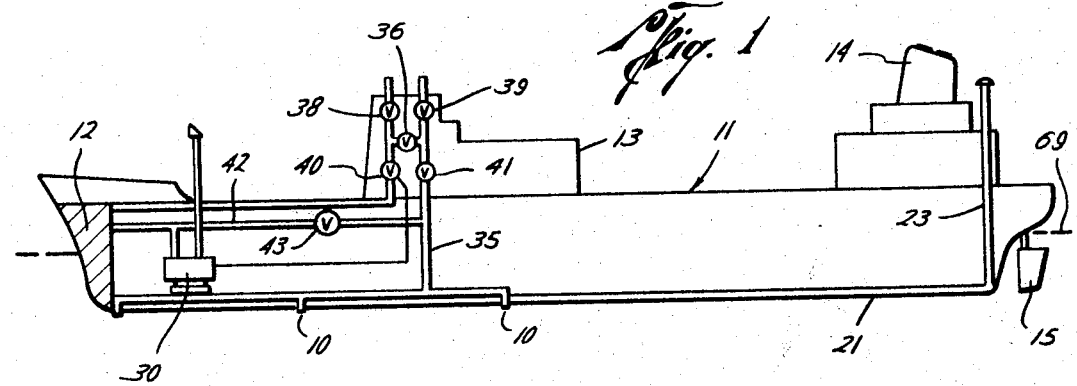
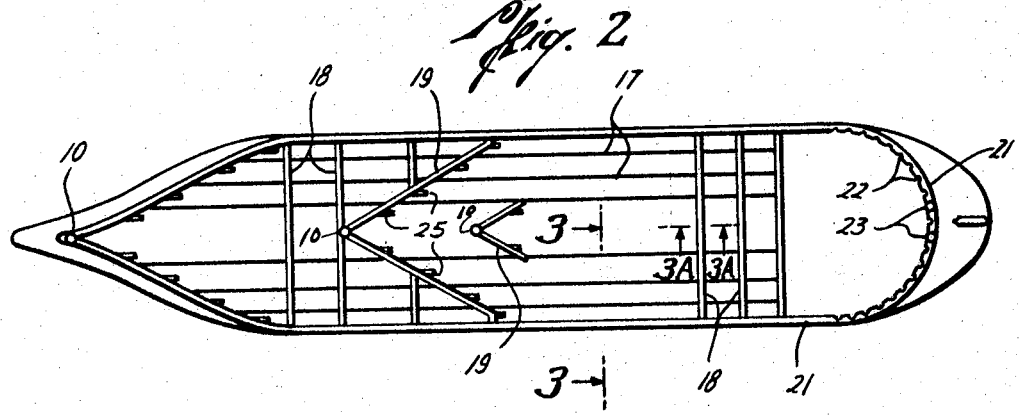
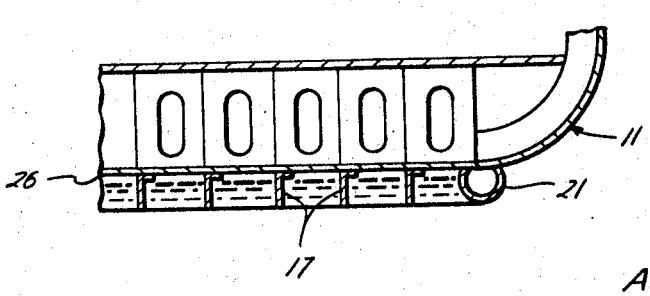
Augustine J. Tucker
INVENTOR.
BY
ATTORNEY July 15, 1969   A. J. TUCKER   3,455,267
SYSTEM FOR REDUCING FRICTIONAL DRAG RESISTANCE ON A SHIP HULL
Filed Jan. 15, 1968   2 Sheets-Sheet 2
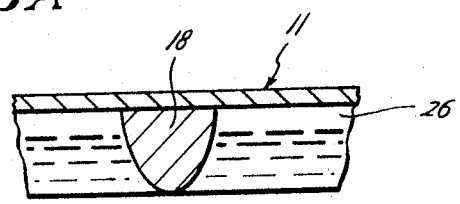
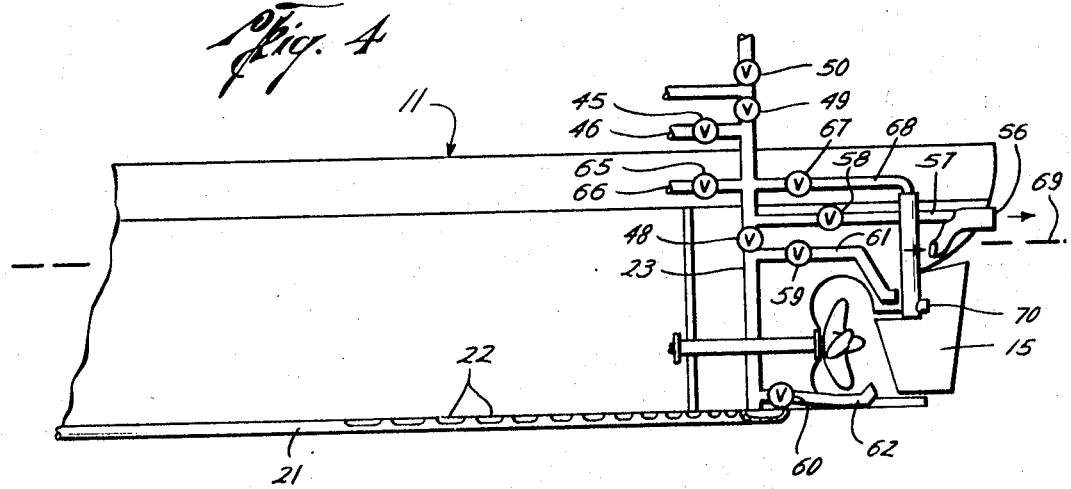
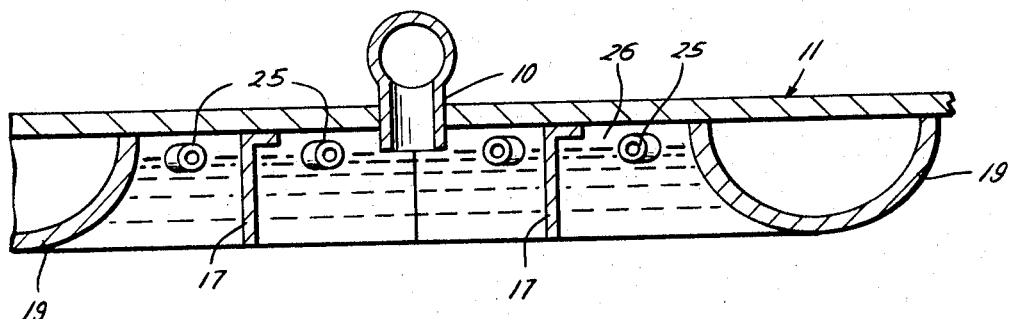
Augustine J. Tucker
INVENTOR.
BY
ATTORNEY

United States Patent Office 3,455,267
Patented July 15, 1969

---

3,455,267
SYSTEM FOR REDUCING FRICTIONAL DRAG RESISTANCE ON A SHIP HULL
Augustine J. Tucker, 911 S. Post Oak Lane,
Houston, Tex. 77027
Filed Jan. 15, 1968, Ser. No. 697,830
Int. Cl. B63b 1/34
U.S. Cl. 114—67                                       4 Claims

ABSTRACT OF THE DISCLOSURE

A system for reducing frictional drag resistance on a ship hull by interposing a gas stream between the hull plating and the water. The system includes grid members on the bottom of the vessel which form generally longitudinal channels having gas injection means toward the forward ends thereof. Gas is injected into the channel during forward movement of the vessel to thereby provide a film of gas on which the vessel is supported to thereby reduce frictional resistance. The specification also teaches means for generating the gas and injecting it into the channels and means for collecting spent gas once the ship has passed thereover.

---

This invention relates to a system for reducing frictional drag resistance on a ship hull. More particularly, it relates to a system on a marine vessel hull for forming a gas film on the bottom side thereof during forward movement of the hull so that the hull is supported on a film of gas to thereby reduce frictional drag. The system also may include means for generating the gas and means for collecting the spent gas once the ship has passed thereover.

There have been many prior art attempts to build hulls for the general purpose of reducing frictional resistance during movement through or over a body of water. For example, certain of the prior art efforts were directed toward aerating the water with the hope of reducing the viscosity of the water and thereby reducing frictional drag. Other prior art attempts include supporting a vessel by raising the vessel out of the water by compressed air or the like. However, this system is generally not applicable to large ocean-going vessels of the cargo type because of the power requirements to raise the hull from contact with the water.

It is therefore an object of this invention to provide an improved system for reducing frictional drag resistance on a marine vessel hull, which system overcomes the shortcomings of the prior art and provides a novel and economic means for accomplishing the desired results.

Briefly stated, this invention is for a system for reducing frictional drag resistance on a marine vessel hull, which system includes a plurality of generally longitudinally extending and generally downwardly depending members attached to the bottom side of the hull. There is also a plurality of generally transversely extending and generally downwardly depending transverse grid members attached to the bottom side of the hull, with the longitudinal members and grid members forming a plurality of generally longitudinally extending downwardly facing channels for retaining gas therein. The system includes a plurality of injection nozzles arranged for injecting a stream of gas into the forward end of a substantial portion of the longitudinal channels. The system also includes means for passing gas through the injection nozzles at sufficient pressure to displace water from at least the top portion of said channels, at least during times of forward movement of the hull, whereby the hull is supported by a gas film during forward movement thereof.

Certain embodiments of the invention may also include gas generating means for supplying the pressurized gas for delivery to the nozzles, and storage tank means for storing a supply of pressurized gas at certain times. Certain embodiments of the invention may also include collection means connected to the stern of the hull and below the water line for collecting the gas after the vessel has passed thereover and utilizing this gas for certain purposes, such as propulsion and the like.

Reference to the drawings will further explain the invention wherein like numerals refer to like parts and in which:

FIG. 1 is a generally central sectional view of a hull having the system of this invention installed therein.

FIG. 2 is a bottom view of the vessel shown in FIG. 1.

FIG. 3 is a sectional view taken generally along line 3—3 of FIG. 2.

FIG. 3a is a view taken generally along line 3a—3a of FIG. 2.

FIG. 4 is a fragmentary and enlarged view of the stern portion of the vessel shown in FIG. 1 and showing the collection means for the spent gas in greater detail.

FIG. 5 is a fragmentary and enlarged view of injection nozzles shown schematically in FIGS. 1 and 2.

As stated above, one of the purposes of this invention is to reduce the frictional resistance of marine hulls by severing the shell plating-water contact on the horizontal underside surfaces of the hull. This is accomplished by introducing a stream of gas under sufficient pressure to displace the water downwardly and outwardly.

One of the basic principals of this invention is the maintenance of a severance film of gas in intimate contact with the plating on the bottom of the vessel. During movement of the vessel forawrdly, it will glide over this film. Hence, a continuous supply of the gas is required. While it is presently thought that the thickness of the gas film need be no more than a few mils thick, practical considerations make it preferable that the film be of a thicker dimension. The amount of gas which is required for feeding to the system on a continuous rate is basically determined by multiplying the area of the ship's bottom in square feet, times the thickness of the film in feet, times the speed in ship's length per minute in order to arrive at the cubic feet of gas per minute required for the system. With this volume established and the displacing air pressure determined from the depth of draft of the ship, the horsepower requirements can easily be calculated. With this figure determined, the economics of this system over prior art systems can be readily evaluated to determine whether or not the additional costs thereof are overweighed by the advantages thereof, as will be discussed hereinafter more fully.

Referring now to FIG. 1, a marine vessel hull is generally designated by the numeral 11 having a fore peak tank 12, a control room 13, a stack 14 and a rudder 15, all of which may be of standard design and configuration.

Referring now to FIG. 2, the bottom of the vessel is provided with a plurality of generally longitudinally extending and generally downwardly depending members or plates 17 which are attached to the bottom of hull 11 and extend generally longitudinally therealong forming channels therebetween.

The hull also has attached thereto a plurality of generally transversely extending and generally downwardly depending transverse grid members. The generally transversely extending grid members are designated by the numerals 18 and 19 and are generally oval shaped and may be used as conduits for supplying the pressurized gas to gas nozzles to be described hereinafter.

It is to be understood that longitudinal plates 17 are preferably vertical plates presenting minimum resistance in the line of ship motion while transverse grid members 18 and 19 are generally semicircular in cross section. This term "semicircular" is broadly used to describe either half-rounds which may be used for slower ships of half-ogives for higher speed hulls.

As best shown in FIGS. 2, 3 and 4, the entire perimeter of the hull at a point spaced below the water line is provided with a shroud member 21 which is generally an extension of the faired shape of the hull and portions of which may be used as a conduit, which will be explained hereinafter.

As best shown in FIGS. 2 and 4, shroud member 21 is provided with a plurality of collection inlet ports 22 on the leading side of that portion of the shroud surrounding the stern end of the vessel, which are for the purpose of collecting spent gas and directing it to conduit pipe 23, to be described in greater detail hereinafter.

Referring now to FIGS. 2 and 5 in particular, the system includes a plurality of injection nozzles arranged for injecting a stream of gas into the forward ends of a substantial portion of the channels formed between longitudinal plates 17. Typical main injection points are designated by the numeral 10 and are connected by any convenient means to receive pressurized gas therethrough. The main gas injection points are central in the vessel but the distribution of the gas stream is spread over the entire horizontal under-surface of the hull using the hollow, semicircular grid members 19 as conduits which emit the gas at various openings 25 into the channels formed between longitudinal plates 17. The lower end of injection nozzles 10 can extend a short distance, such as one half inch or the like, below the lower surface of the hull 11, or stated another way, arranged to discharge at a point intermediate the hull surface and the lower edges of longitudinal plates 17, whereby a pocket of gas designated by the numeral 26 is retained even when the nozzles are vented, to thereby provide a compartment with free surface water under the vessel.

During operation of the vessel, it is to be understood that the gas pocket 26 will be thicker than shown in FIG. 5, for example, to the extent that it extends substantially to the bottom portions of plates 17. It is to be further noted that the injection nozzles are located in the forward ends of the longitudinal channels such that a film of gas is provided thereto over which the vessel travels during forward movement. Transverse grid members 18 are arranged such that they maintain a depth of gas trapped in the downwardly facing pockets. They also facilitate the movement of gas thereunder because of their semicircular shape, such that the gas can easily flow thereunder to ports 22. The vertical dimension of plates 17 and transverse grid members 18 and 19, may for example, be six inches deep. The purpose of this is to establish a cushion or bubble of gas as a reservoir or cushion to serve a number of purposes. Gas feed pressure required to establish the gas cushion and severance film is determined by the hydrostatic pressure of the deepest part of the grid, and will be something more than the pressure required to maintain the one-half inch film.

The motion of a ship hull through water creates waves which are evident on the surface. On the bottom of the hull, it is thought that these waves manifest themselves as pressure differentials along the shell plating, with the differentials varying by perhaps as much as 4 p.s.i. If only the one half inch gas film is present, these pressure differentials might choke off the flow and force the gas stream out the sides. With the cushion of deeper dimension, pressure differentials of this magnitude compress the dimension of the thicker cushion in only minor proportion. There may be a small constriction of the flow of gas by these pressure differentials, but this is not enough to interrupt the flow of the functional one half inch gas film.

In rolling motions of hull 11, the gas pocketed in the grid system will spill out around the bottom edges of the longitudinal members. This is an alternating motion, with grid members being first on the high side, gas spilling out around the shroud; then on the downward swoop, gathering gas out of the water which has spilled from the low side grid. The amount lost on each roll depends on the degree of roll, the period of roll, the spacing of the grid members, the depth of the grid members, etc. Except in very high degrees of roll, the gas which is lost is from the cushion and not from the severance film. The integrity of the shell-plating water separation is maintained. However, as this cushion gas is lost, the grid members will protrude down into the water to add their wetted surface area to frictional resistance. This area can be expressed as a percentage of drag introduced in exchange for a percentage of drag removed by the film. It is quite minor. Hence, these immersions detract very little from the benefits derived.

The passage of a wave, from ahead or from the side, brings with it a change in hydrostatic head pressure to create an alternating compression and expansion of the gas cushion. These head changes are absorbed by the thickness of the cushion in the same manner as the standing wave pressure differentials are absorbed.

When the ship is laboring in a seaway so that its speed is slowed, the gas film thickens beyond its designed dimension. This is because "ship lengths per minute" in the formula are less, yet the rate of gas feed is the same. Hence, there is a gain in the protective film to compensate for greater loss from the cushion depth from the motion.

The grid system is its arrangement of vertical plating members, serves as an anti-rolling device. It is fairly common-place to install plate members on the bilge knuckle of a hull which, by the action of water swirling around the edges, produce a braking action to reduce the angular velocity in roll.

However, in the case of grid members of this invention, there is another dynamic force beyond the simple braking action of the areas sweeping through the water. In calm weather and even keel conditions, the grid pockets are completely filled with gas. Even though they are open faced on bottom, this bubble of gas has the effect on the stability of the ship as though there were a completely void compartment on bottom exerting a buoyant moment on the hull as a floating vessel. When seaway action causes gas leakage and the gas supply is insufficient to keep a full bubble, there will be a water line in the pockets. This water, in motion from side to side in the pocket, has a "free surface" effect which, in itself, has the effect of reducing the ship's righting arm. Reducing the righting arm slows the period of roll. Thus, there is the combination of free surface and the immersed grid plating edges to slow down the rolling motion. This serves to reduce the gas loss from the pockets.

Thus, the combination of the slowed ship creating a thicker film and a diminished gas loss due to less rolling action helps to keep the severance film in place even in the severest weather.

The invention also includes means for passing gas through nozzles 25 at a sufficient pressure to displace water from at least the top portions of the channels formed between longitudinal plates 17, at least during times of forward movement of hull 11, whereby hull 11 is supported by a gas film during the forward movement thereof. Hence, gas generating means are provided for generating a supply of pressurized gas for delivery to injection points 10 and nozzles 25. The numeral 30 is used to designate a gas generator in FIG. 1. It is to be understood that this term is to be construed broadly and covers any number of devices such as air compressors, gas burner utilizing hydrocarbon fuels, and the like. Examples of suitable gases include air as well as the gases resulting from the combustion of hydrocarbon fuels and the like. Generally speaking, any gas may be used as long as it is non-explosive, non-corrosive, non-lethal and preferably non-noxious.

The high cost of compressing air is found in the low efficiency of energy utilization. Stack and cooling water losses in the prime mover for the compressor are the greatest loss. Hence, hydrocarbon gases may be much cheaper as the displacing gas. The gas stream may be a specific hydrocarbon combustion gas; or such a gas mixed with some compressed air. In the text, the word "gas" is used throughout to express the full scope of possible gas sources even beyond those named. For example, carbon dioxide or nitrogen would serve if economical means of generating these gases were devised.

Hydrocarbon gas generators which might be used as supply sources are internal combustion engines, gas turbines, free piston engines, pressure combustion pots. Any of these devices used in this service would be operating at high back pressures, upward to 25 or 30 p.s.i. Although unusual, these operating conditions are not impossible.

Since hot exhaust gases may be delivered to the system, cooling coils may be installed (not shown) between the generator and the storage receiver. One system is to install the coils on the shell plating where the motion of the ship will provide a natural circulation for cooling.

Although the exhaust gas might be fed directly from the generator to the injection points, the large volumes of gas employed indicate that a storage tank should be included. Forward peak tank 12 will serve since the peak pressures in the system will be no more than the corresponding depth of the keel. Ship hull compartments are constructed to hold hydrostatic bursting pressures greater than their depth, so unusual strengthening of this normally empty compartment is not necessary. It is evident that the use of this space for storage is not the only solution. Any pressure vessel of suitable size and burst capacity will serve.

The main conduit for conducting gas from pipe 12 to nozzles 25 is designated by the numeral 35. It is so arranged that a portion thereof in control room 13 is at a height well above the water line to keep water surges during periods of violent ship motion from flowing into tank 12. Valving for controlling flow of gases through piping 35, includes master control valve 36, relief valve 38 and vent valve 39, the latter two of which vent to the atmosphere. Relief valve 38 is arranged to vent gas when the pressure in tank 12 exceeds a predetermined pressure for safety reasons in the event that the governor on generator 30 fails to operate when the maximum pressure is reached. Further, vent valve 39 is arranged to vent gas from the system when the ship is not under way, for example. Conduit 35 may also include supply pressure sensing valve 40 located upstream from master valve 36, and arranged to be connected to gas generator 30 to assure that sufficient pressure is being delivered through piping 35. In addition, piping 35 includes volume control orifice valve 41 mounted downstream from valve 40.

In addition, the conduit 35 includes bypass pipe 42 having bypass valve 43 therein, with pipe 42 interconnecting tank 12, generator 30 and piping 35, as shown.

In operation, the gas generator 30 would normally supply tank 12 with an adequte supply of pressurized gas at a predetermined pressure level sufficient to accomplish the intended purpose of creating the gas film and gas cushion. Flow of the compressed pressurized gas to injection nozzles 25 through conduit 35 is controlled by master valve 36. Alternatively, by placing valve 36 in the closed position, pressurized gas may be conducted directly from gas generator 30 by opening valve 43. Regulation of the supply is generally in three operations, as follows:

(a) The maintenance of sufficient supply pressure in tank 12 is performed by a governor control on gas generator 30.

(b) The pressure supplied to injection nozzles 25 varies with the hydraulic draft of the ship, such that the water displacement will occur. This can be varied by manuel changes at valve 40 to satisfy the different drafts at which the ship operates when its loading changes.

(c) The rate of flow, as noted above, is a calculation for a given ship at its full load and full speed. This is the maximum power requirement but least gas volume condition. When the ship is lighter, the pressure requirement decreases. At the same time, the ship gains speed because its displacement is less so the volume of gas increases since "ship lengths per minute" is one of the factors in the equation. On the other hand, if the valve openings are kept constant, the flow through the valves will increase when the pressure downstream decreases. Hence, the system of controls is the means of balancing the compensating factors to adjust to changing conditions.

The system, then, is basically controlled by varying the pressure in storage tank 12 which is the basic control of the applied power efficiency.

Vent valve 39 is arranged such that gas pockets formed by the grid system can be bled off through nozzles 25 by opening vent valve 39. However, since the nozzles 25 project below the bottom surface of hull 11, as shown in FIG. 5, gas film 26 will be retained in the grid system. This is for the purpose of establishing a free surface water line. If the vessel is at anchor in an open sea, this feature can calm the ship motion to a considerable extent.

When the vessel is under way and the full hull length has passed along the gas film pad, the gas has completed its severance function and can be dissipated. However, it can destroy many of its benefits or even become detrimental to efficiency of the vessel if the dissipating gas is simply streamed into the water to bubble out around the propeller or propellers. Gas entrained in the water causes erosion on the surface of the propeller blades. A turbid water-gas mixture is lighter in density than water itself so that the propeller will be pumping a fluid lighter in weight than the designed condition. Hence, there is need for diversion means near the stern of the hull and below the water line for channeling the spent gas to avoid the aforesaid difficulty. The gas may be collected and utilized to provide forward propulsion of the hull itself.

As shown in FIGS. 2 and 4, and as previously explained, inlet ports 22 of shroud member 21 are arranged to conduct the spent gas to piping or stacks 23. One important consideration is, as noted above, to prevent the spent gas from entering the propeller feed stream. Evidently, if the stacks are conducted to free atmospheric exhaust, the gas would prefer to follow this path of greatest pressure drop instead of leaking out to the surrounding water at the hydrostatic pressure depth. Hence, it is desirable that ports 22 and shroud collection 21 be large enough in area to permit the flow of the spent gas therethrough.

However, there is contained in this escaping gas a considerable amount of energy. Utilization of this energy would therefore contribute to the overall economy of this system, provided this spent gas could be used in a manner whereby the back pressure imposed on the collection ports 22 were maintained within proper bounds. For example, the gas could be recirculated back to gas generator 30, in the event it was a compressor, to provide a positive suction input and reduce the amount of power needed there. Hence, this system may include a valve 45 mounted in conduit 46 intercommunicating pipe 23 and the compressor suction, as shown in FIG. 4, through appropriate dryers, separators, and the like, to prevent erosion and seal problems in the compressor.

Between the extremes of highest pressure drop, as would result in venting pipe 23 to the atmosphere through valves 48, 49 and 50, and least pressure drop, as might occur in conducting the spent gas through valve 45, there are other possible ways to utilize the energy. Two of these are related because they provide thrust to drive the ship forward.

Since the gas is of high humidity, and probably contains droplets of water, there is both density and velocity which will provide thrust if proper nozzles are fitted and the back pressure is held to the least amount possible. The aforesaid nozzle system has a risk of overthrottling, for example, from solid slugs of water being carried in a stream. It presently seems more practical to arrange discharge of the gas through full opening conduits positioned at the stern of the ship above the water line 69 to provide forward thrust. Into the stream of high velocity gas, a stream of additional water droplets may be introduced to increase the density of the outflow. This additional water may come from a pickup scoop or water scoop such as scoop 56 which directs the picked up water in the direction astern.

The exhausting gas, collected at ports 22, passing through conduit 23, valve 48, valve 58, flows through conduit 57 and enters the stream of water being ejected from scoop and nozzle 56. The mixture of high velocity gas and the high density water impart an ahead thrust to the vessel, augmenting the propulsion thrust developed by the ship's main propeller or propellers.

Appendages on the hull of the ship, to which the scoops are secured create both additional area for frictional resistance, appendage resistance for a parasite drag. A properly designed scoop and conduit system for this water flow would detract very little from the benefits derived from the augmented thrust. It is evident that the greatest benefits will be derived if this augmenting water is broken up into the finest particles for most thorough mixing in the gas stream. In this system, the gas escape is unrestricted and at full atmospheric flow whether there be water supplementation or not.

Valve 60 connected to conduit and nozzle 62 and valve 59 connected to conduit and nozzle 61 are means for conducting the exhausting gas to the backside of the ship's main propeller. A propeller is a pump which imparts velocity to the water. The reaction to the work performed in moving this water creates a thrust in the opposite direction which moves the ship. Since the propeller is submerged in the water it is pumping, the amount of water and the reaction thrust depends on the velocity which is imparted; or in more conventional pumping terms, the back pressure. Nozzles 61 and 62 accelerate the wake of the propeller. The back pressure is reduced so the reaction thrust on the propeller is increased. The propeller efficiency is improved.

Alternatively, and since boilers in steam ships require large volumes of air for he furnaces, this collected gas or air could be used directly to supply air to the burners under pressure or this combustion air could be supplied by installing a gas stream injector in the exhaust stacks to create a vacuum in the furnace which is sometimes referred to as induced draft. The collected air in pipe 23 may be used in either manner. The pressure required for forced draft is quite low, but variable as burner dampers are opened and closed. If the collected gas stream is directed into the stack, dissipating gas would have a full opening at all times, and perhaps even gain some additional pressure drop and exhaust velocity from the natural stack draft. Hence, the collected gas could be directed from pipe 23 to the boiler through valve 65 connecting in conduit 66.

Valve 67 with conduit and nozzle 70 direct the stream of exhausting gas to the rudder 15 of the ship. In this position, the dissipating energy is accelerating the wake of the propeller as do nozzles 61 and 62. However, positioned on the rudder, the ejecting stream serves also as a thruster to move the stern of the ship in desired directions, serving to augment the action of the rudder. A number of beneficial effects on vessel performance can be anticipated. Steering the vessel on the desired course is gained with less rudder action, hence less dynamic resistance which slows the vessel down. Smaller rudders can be installed, thereby reducing the appendage resistance. Since conventional rudders are effective only when there is ship motion to create water flow pressure against the rudder surface, if the ship is stopped or at very reduced speed, the stern can be moved in either direction by the action of the thruster nozzles alone, simply by moving the rudder from side to side with its conventional powering mechanisms.

Although the foregoing discussion is centered on ships in the open sea, the invention can be applied equally as well to inland equipment such as tugs, ferries and barges. Since such inland vessels do not normally encounter high waves and resulting motion and gas losses, the thickness of the gas cushion effected by the grid could be reduced.

What is claimed is:

1. In a system for reducing frictional drag resistance on a ship hull, the combination comprising:
   a plurality of generally longitudinally extending and generally downwardly depending members attached to the bottom side of said hull;
   a plurality of generally transversely extending and generally downwardly depending transverse members attached to the bottom side of said hull, said members forming a plurality of generally longitudinal extending downwardly facing channels for retaining gas therein;
   a plurality of injection nozzles arranged for injecting a stream of gas into the forward ends of a substantial portion of said longitudinal channels;
   means for passing gas through said injection nozzles at a sufficient pressure to displace water from at least the top portions of said channels at least during times of forward movement of said hull, whereby said hull is supported by a gas film during said forward movement;
   means connected to the stern of said hull and below the water line for diverting said gas along a predetermined path after injection thereof into said channels and after said hull has passed thereover during forward movement of said hull, said diverting means including means arranged for collecting said spent gas; and
   discharge means connected to said collecting means for discharging said collected gas into the wake of said hull during forward movement thereof to provide a propulsion force thereto.

2. In a system for reducing frictional drag resistance on a ship hull, the combination comprising:
   a plurality of generally longitudinally extending and generally downwardly depending members attached to the bottom side of said hull;
   a plurality of generally transversely extending and generally downwardly depending transverse members attached to the bottom side of said hull, said members forming a plurality of generally longitudinal extending downwardly facing channels for retaining gas therein;
   a plurality of injection nozzles arranged for injecting a stream of gas into the forward ends of a substantial portion of said longitudinal channels;
   means for passing gas through said injection nozzles at a sufficient pressure to displace water from at least the top portions of said channels at least during times of forward movement of said hull, whereby said hull is supported by a gas film during said forward movement;
   means connected to the stern of said hull and below the water line for diverting said gas along a predetermined path after injection thereof into said channels and after said hull has passed thereover during forward movement of said hull, said diverting means including means arranged for collecting said spent gas; and
   discharge means for directing gas collected by said collection means in the astern direction above the water line of said hull to provide forward thrust thereto.

3. The invention as claimed in claim 2 including:
   means for injecting water into the gas stream created by said discharge means to thereby augment said forward thrust.

4. In a system for reducing frictional drag resistance on a ship hull, the combination comprising:
- a plurality of generally longitudinally extending and generally downwardly depending members attached to the bottom side of said hull;
- a plurality of generally transversely extending and generally downwardly depending transverse members attached to the bottom side of said hull, said members forming a plurality of generally longitudinal extending downwardly facing channels for retaining gas therein;
- a plurality of injection nozzles arranged for injecting a stream of gas into the forward ends of a substantial portion of said longitudinal channels;
- means for passing gas through said injection nozzles at a sufficient pressure to displace water from at least the top portions of said channels at least during times of forward movement of said hull, whereby said hull is supported by a gas film during said forward movement;
- means connected to the stern of said hull and below the water line for diverting said gas along a predetermined path after injection thereof into said channels and after said hull has passed thereover during forward movement of said hull, said diverting means including means arranged for collecting said spent gas;
- at least one gas discharge nozzle attached to the rudder of said hull; and
- means for directing gas collected by said collection means to said nozzle attached to said rudder, to provide forward acceleration to said hull and improved rudder steering thrust.

References Cited
UNITED STATES PATENTS 1,621,625   3/1927   Casey _____ 114—67

ANDREW H. FARRELL, Primary Examiner